United States Patent
Goldman, Jr. et al.

[11] 3,868,687
[45] Feb. 25, 1975

[54] TIME MEASURING SYSTEM
[75] Inventors: Leman Goldman, Jr., Pennsauken, N.J.; Ted E. Dunn, Levittown, Pa.
[73] Assignee: Radio Corporation of America, Princeton, N.J.
[22] Filed: Oct. 31, 1955
[21] Appl. No.: 543,836

[52] U.S. Cl............ 343/13 R, 343/7.3, 343/17.1 R
[51] Int. Cl.............................. G01s 9/16, G01s 9/06
[58] Field of Search......... 343/7.3, 7.4, 11, 13, 17.1

[56] References Cited
UNITED STATES PATENTS
2,854,662   9/1958   Westwood.......................... 343/13 R

*Primary Examiner*—Maynard R. Wilbur
*Assistant Examiner*—G. E. Montone
*Attorney, Agent, or Firm*—Edward J. Norton

EXEMPLARY CLAIM

14. In a radar ranging system, in combination, a stable source of sinusoidal oscillations; means for deriving from said source a series of first pulses spaced fixed intervals from one another; a source of randomly occurring pulses; selector means connected to receive said randomly recurring pulses and said first pulses for selecting certain ones of said first pulses at a randomly recurring rate; phase shifting means for shifting the phase of said sinusoidal oscillations; means for deriving from said phase shifted sinusoidal oscillations a series of second pulses; a step-down counter circuit; cyclic means operatively associated with said phase shifting means and receptive of said selected pulses for rendering said step-down counter operative beginning at a time in coincidence with a given one of said second pulses, the output of said step-down counter comprising a series of third pulses spaced a given plurality of times said fixed intervals from one another; selector means receptive of said third pulses for selecting a given one of said third pulses; and means including said cyclic gate means responsive to a shift in phase between said series of first pulses and said series of second pulses an amount approximately equal to one period of said series of third pulses for rendering said step-down counter responsive to the one of said second pulses spaced from said given second pulse an amount equal to one period of said series of third pulses in the direction opposite to that of said phase shift.

14 Claims, 9 Drawing Figures

INVENTORS
LEMAN GOLDMAN, JR.
& TED E. DUNN
BY J. C. Whittaker
ATTORNEY

TIME MEASURING SYSTEM

The present invention relates to an improved time or phase measuring system of the type particularly adapted to use in radar ranging systems but not necessarily exclusively limited to such use.

A full understanding of the invention and its important advantages requires a brief explanation of the present state of the art. One known system which is fairly typical includes a central time base oscillator such as a crystal controlled oscillator which generates a sinusoidal wave, and means for converting the sinusoidal wave to fixed phase pulses spaced fixed intervals of time from one another. A divider circuit receives these pulses and produces output pulses spaced a plurality of times the fixed intervals from one another. In one form of the system, for example, the fixed phase pulses may be spaced the time equivalent of 2,000 yards from one another and the divided down pulses the time equivalent of 96,000 yards from one another.

The divided down pulses may be employed to trigger a radar transmitter. They are also employed to trigger a first gate generator. The leading edge of each generated gate coincides in time with a divided down pulse and, when the radar system is tracking, the duration of the gate is a function of the range of the target being tracked. The lagging edge of the generated gate triggers a second gate generator which produces a gate approximately 2,000 yards wide.

The sinusoidal wave is also applied through a phase shifting circuit to a second pulse forming circuit to produce pulses which are shifted in phase with respect to the fixed phase pulses. The phase shifted pulses and the 2,000 yard wide gates are applied to a coincidence circuit which produces a single output pulse each time a 2,000 yard gate is in coincidence with one of the phase shifted pulses. This single pulse is known as a range trigger and, when the radar system is tracking a target, it bears a predetermined time or phase relationship to said target.

A detailed description of an automatic tracking radar system similar to the one described above may be found in Chapter 5 of TM—11–1524, a manual published by the War Department in July, 1946.

At relatively short ranges the system described operates quite well. However, as the range of the target increases and approaches the limit of the radar equipment the first gate becomes extremely long. At the present state of the art, gate generator circuits can be designed to only a certain degree of accuracy. At close range where a selection must be made of say one 2,000 yard phase shifted pulse in 10 or 12 phase shifted pulses, this degree of accuracy is adequate. However, at the extreme range of the equipment where one pulse in 40 or more pulses must be selected, any amount of instability or nonlinearity in the gate circuit caused, for example, by changing circuit parameters or changing conditions of ambient temperature results in the selection of the wrong phase shifted pulse. This, in turn, results in a corresponding error in the measurement of the distance of the target being tracked.

The above difficulty is multiplied considerably in modern radars which have ranges considerably in excess of 96,000 yards. Thus, today ranges of 200,000 yards (roughly 120 miles) and upward are becoming more and more common. At these ranges if pulses spaced 2,000 yards from one another are employed, and, spacing at least this close is usually needed to obtain the required short range accuracy from the system, the gate generator is required to be sufficiently accurate to select one of 100 or more pulses at the extreme range of the radar. This means an accuracy of roughly 1 percent or better and such gate generators are either impossible or, at best, extremely expensive to construct.

It is an object of the present invention to provide an improved phase or time measuring system of greatly improved accuracy.

It is another object of the present invention to provide an improved radar ranging circuit adapted to be externally triggered at time modulated or, alternatively, nonpredictable repetition rates.

The present invention, in general, proposes the use of a multiple rather than a single pulse selection system. A typical form of the invention includes means for generating a first wave of predetermined frequency and means for generating a second wave at said predetermined frequency. A generator means, responsive to a given selected portion of the second wave, generates a third wave which is coherent in phase with said second wave and is at a frequency which is subharmonically related to the predetermined frequency. Means are provided for shifting the phase of the second wave relative to that of the first wave. When the phase shift exceeds a predetermined angle the generator means is made responsive to a different selected portion of the second wave, this one spaced from the given selected portion an amount equal to one period of the third wave, in the direction opposite that of said phase shift.

In a preferred form of the invention the first and second waves comprise series of first and second pulses respectively, the pulses of each series being spaced the same fixed intervals from one another. The series of first pulses may be derived from a source of a stable sinusoidal wave and the series of second pulses from the same sinusoidal wave which has been shifted in phase. A given one of the second pulses is selected and employed to trigger a step-down counter which produces a series of third pulses (the third wave) spaced from one another a plurality of times said fixed intervals. When the phase shift between the series of first pulses and the series of second pulses is approximately equal to one period of the series of third pulses, the step-down counter is made responsive to a different one of the selected pulses, this one spaced from the former selected second pulse an amount equal to one period of the series of third pulses in the direction opposite that of said phase shift.

The important advantage of the circuit proposed is its greatly improved accuracy, especially at longer ranges. Assume, for example, that the pulses of the first series are spaced 2,000 yards from one another and the pulses of the second series are also spaced 2,000 yards from one another. Assume also that the counted-down pulses are spaced 16,000 yards from one another, and that whenever the phase shift between the series of first and second pulses is equal to approximately 16,000 yards the pulse employed to trigger the step-down counter is selected 16,000 yards earlier in time. Assume also now that the maximum range of the radar equipment is 200,000 yards. Since the maximum phase shift permissible between a selected pulse of the first series and the pulse of the second series which triggers the step-down counter circuit is 16,000 yards, the circuit accuracy required is only about 12 percent (the selection of one pulse in eight pulses). (In a practical circuit the accuracy requirement may be slightly higher to provide for additional delays between pretrigger pulses and transmitted pulses, etc.) The delay between the first of the counted-down pulses and one occurring at a time equivalent to the extreme range of the radar equipment would, at most, be somewhat under 200,000 yards. Thus, the accuracy requirement for the selection of a counted-down pulse is at the most about 8 percent (the selection of 1 pulse in 12 pulses). The above degrees of accuracy are well within the present state of the art and require no elaborate compensation circuits.

Another important advantage of the system proposed, as will be explained in greater detail below, is that it permits the use of non-predictable or, alternatively, time modulated external triggering pulses for synchronizing the system. In prior art arrangements, on the other hand, the external triggering system insisted on controlling the repetition rate and maintaining it fixed thereby preventing the use of non-synchronous triggers.

The invention will be described in greater detail by reference to the following description taken in connection with the accompanying drawing in which.

Figure 1:
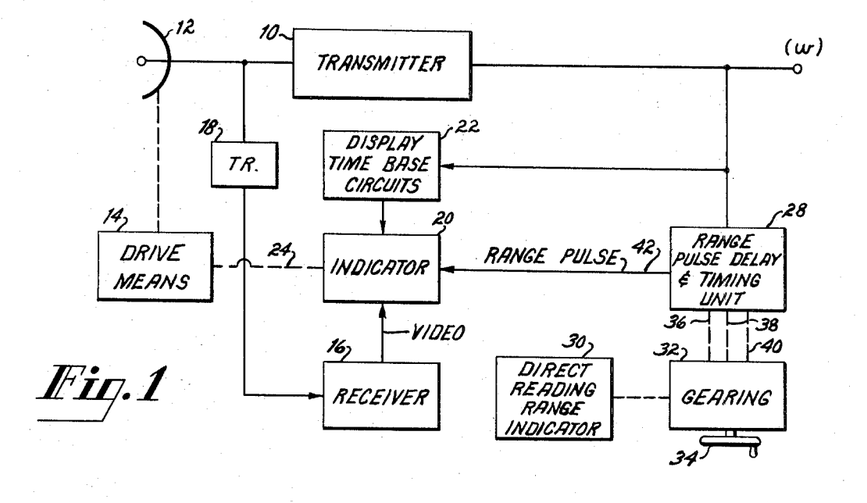
FIG. 1 is a block circuit diagram of a radar system employing the present invention.

Referring now to the drawing and in particular to FIG. 1, transmitter 10 is supplied with pulses w which periodically or aperiodically trigger the transmitter. The latter supplies energy to antenna 12 which may be a fixed or scanning antenna. In the latter event the antenna is driven by a drive means 14 such as a motor. The antenna radiates a directional beam of radio frequency pulses and receives echoes reflected from reflecting targets. The transmitted energy is prevented from reaching receiver 16 by a transmit-receive device 18. The received pulses, however, are passed through the transmit-receive device to the receiver and the received demodulated pulses applied to an indicator device 20 such as a plan position indicator or the like. The time base circuits 22 for indicator 20 are triggered by pulses w to maintain the time base circuits in synchronism with the transmitted pulses. If a plan position indicator is employed it may include rotatable deflection coils (not shown) and these would be driven by the drive means 14 via mechanical coupling 24. Since the transmitter circuits, receiver circuits, indicator circuits and other circuits discussed so far are conventional and well known to those skilled in the art and moreover, since they per se, form no part of the present invention, it is believed to be unnecessary to describe them in further detail.

In a number of applications it may be desirable to read directly the range of a target of interest. Circuits required to provide direct reading information are included in blocks 28, 30 and 32. Block 28 is a range tracking pulse delay and timing unit. Its function is to produce range pulses in synchronism with the transmitted pulses and to delay the range pulses an interval proportional to the time interval between a transmitted pulse and a corresponding echo reflected from a target of interest. The delay introduced by block 28 may be controlled by a handwheel 34, gearing 32 and mechanical connections 36, 38 and 40. The latter connections vary certain circuit components in block 28 in order to delay the range pulses the correct amount of time. The range pulses may be applied to the indicator 20 via lead 42 and the handwheel 34 moved until the range pulse is superimposed on the received echo of interest. In other similar systems, the range pulse may be employed to trigger a narrow gate which is positionable over the received echo of interest. In both cases, when the predetermined relationship between range pulse and echo is established, the direct reading range indicator 30, which may include a mechanical counting arrangement such as an odometer or, in simpler form, merely a dial and pointer, or any other type of indicator, will indicate the range of the target of interest.

The present invention is concerned mainly with block 28 which will be discussed in greater detail below.

Figure 2:
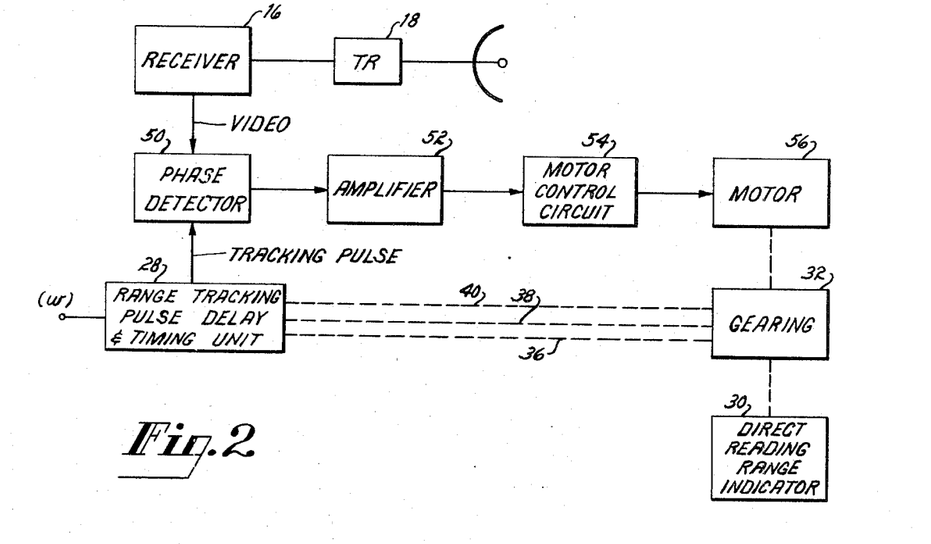
FIG. 2 is a block circuit diagram of a portion of another type of radar system in which the system of the present invention may be employed.

FIG. 2 illustrates a portion of another type of radar system in which the present invention may be employed. In a system of this type, the radar antenna is ordinarily maintained directed at the target being tracked. The transmitter, time base circuits and indicator circuits are not shown since they are similar to the same circuit components in FIG. 1. A received echo is applied through transmit-receive device 18 to a time comparison circuit such as phase detector 50. The range tracking pulse delay and timing unit 28 (which will be discussed in greater detail below) feeds a tracking pulse or other type of wave to be compared in "phase" with the echo to the phase detector. The relative phases of the two pulses are compared and when they are different a d.c. voltage is produced having a sense and amplitude dependent on the direction and magnitude of said difference, respectively. Amplifier 52 amplifies this direct current signal to the proper power level to drive motor control circuit 54 which in turn energizes motor 56. The motor drives the range tracking pulse delay and timing unit through gearing 32 and mechanical connections 36, 38 and 40 in the proper sense to reduce the phase difference between the wave from unit 28 and the received echo pulse of interest to zero, whereby the output of the phase detector is also reduced to zero and the direct reading range indicator 30 reads the proper range of the target of interest. This system is known as an automatic tracking system and is well known in the art. A typical system of the type described above is shown in greater detail in application Ser. No. 459,146 titled PULSE-ECHO SYSTEM, filed Sept. 29, 1954 by D. H. Westwood now U.S. Pat. No. 2,854,662. Other automatic tracking systems similar to the one shown in FIG. 2 may be found in Chapter 8, Volume 20 of the Radiation Laboratory Series titled "Electronic Time Measurements." As in the case of FIG. 1 the present invention resides mainly in block 28 which will be discussed in greater detail below.

Figure 3:
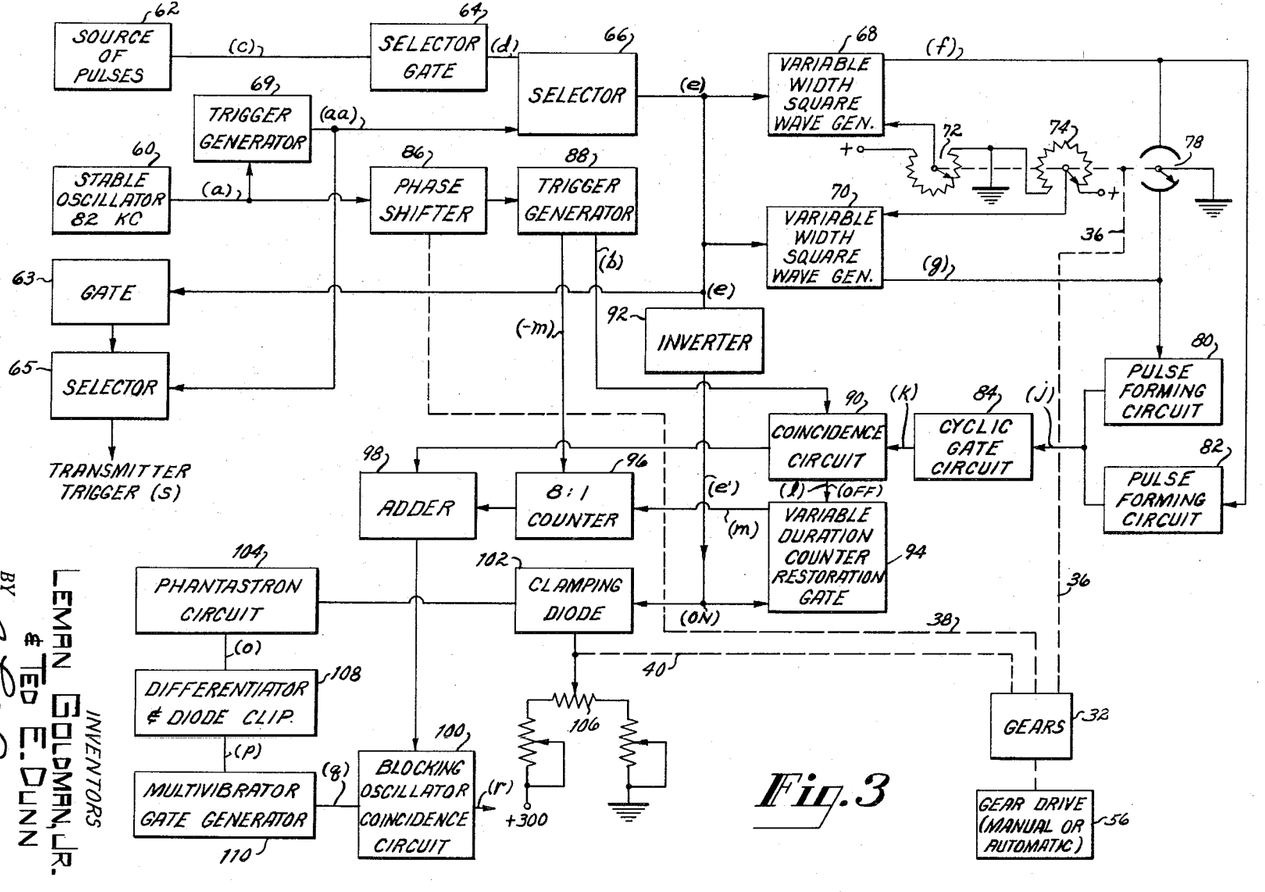
FIG. 3 is a block circuit diagram of a preferred form of the system of the present invention.

FIG. 3 and the following figures show the details of block 28. Referring now to FIG. 3, a source of fixed frequency oscillations such as a crystal controlled oscillator 60 is the central time base of the system. This oscillator, in a typical embodiment of the invention generates a sine wave at a frequency of 81.948 kilocycles. This frequency is chosen because the sine wave period is equal to 2,000 yards of radar range. In the discussion which follows, this frequency will be referred to as 82 kilocycles.

Source 62 provides pulses at a random rate or at some time modulated rate. The phase position of the pulses, for example, may be altered at a rate of 30 or 60 cycles per second. In any case, the time intervals between pulses $c$ should be sufficient to permit a transmitted pulse to reach a target and return. These pulses $c$ are supplied to selector gate 64 which may comprise a multivibrator or the like.

Figure 4:
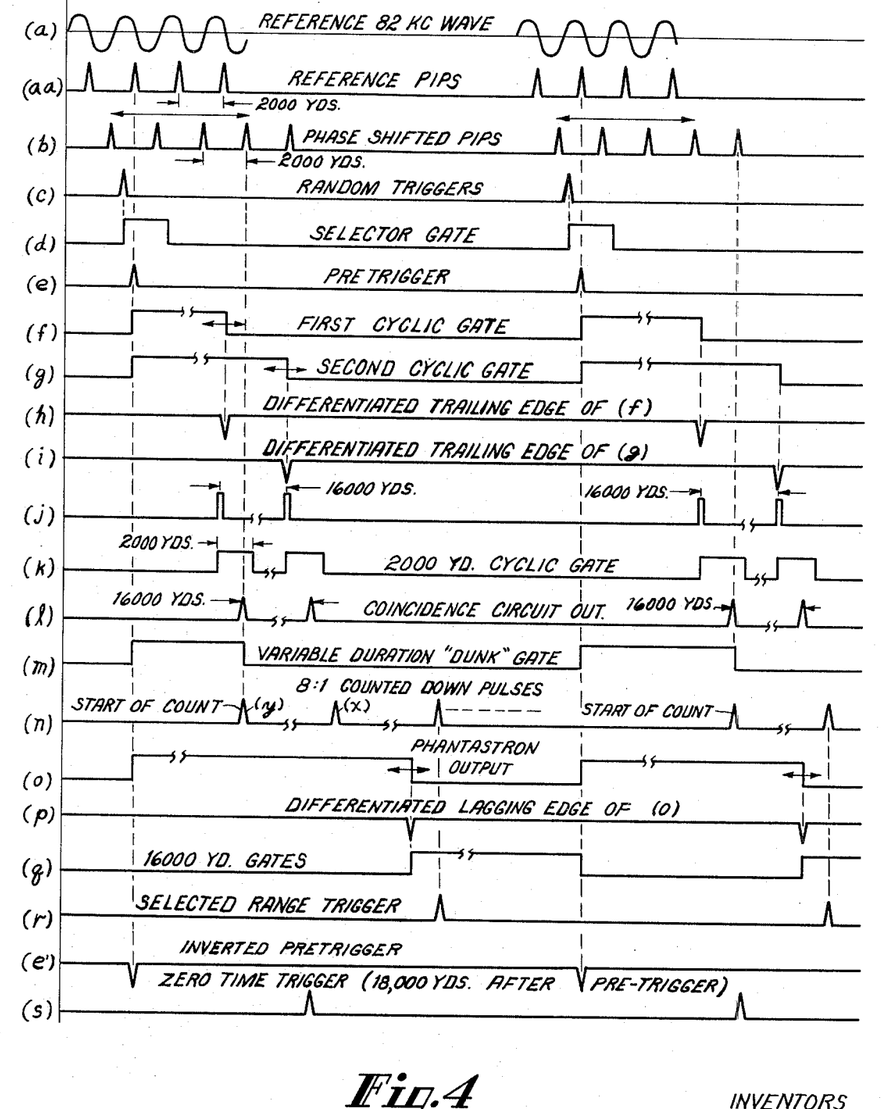
FIG. 4 illustrates the waveforms present at various points in the circuits of FIG. 3 and other figures.

Throughout the discussion which follows, various waveforms will be referred to by the small letters $a$–$s$. These are shown in FIG. 4 and the reader should refer to this figure for a clearer understanding of the invention.

The selector gate produces square wave output pulses $d$ having a duration equivalent to slightly less than 2,000 yards of radar range. These pulses are applied to selector circuit 66. Sine wave $a$ is applied to trigger generator 69 which may consist of a non-linear square wave amplifier, differentiating circuit and clipper. These circuits are conventional and need not be discussed in greater detail. The output of trigger generator 69 consists of pulses $aa$ spaced the equivalent of 2,000 yards of radar range from one another and these are applied to selector 66. Selector 66 comprises a coincidence circuit such as, for example, a tetrode or other conventional circuit. The selector tube is normally non-conducting. The selector gate is applied to the screen grid of the tetrode and trigger pulses $aa$ to the control grid thereof. When the selector gate and trigger pulses occur in time coincidence, an output pulse $e$ is produced hereinafter termed a pre-trigger pulse. It will be apparent from the circuitry just discussed that regardless of whether the pulses 62 are random or time modulated, each pre-trigger pulse $e$ occurs in time coincidence with one of the references (fixed phase) trigger pulses $aa$ or, in other words, the pre-trigger pulses are always "coherent" with the fixed phase reference pulses.

Pre-trigger pulses $e$ are applied to gate 63. This circuit functions to generate a gate approximately 2,000 yards wide after an interval of time the equivalent of approximately 17,000 yards after the time of occurrence of each pulse $e$. The gate is applied to a selector circuit 65 which may be similar to selector 66. Pulses $aa$ are also applied to selector circuit 65. When one of pulses $aa$ is coincident with the 2,000 yard gate from circuit 63, there is produced an output transmitter trigger pulse $s$. The transmitter trigger pulse occurs the time equivalent of 18,000 yards after pulses $e$. These trigger pulses are employed to trigger the radar system transmitter.

Pulses $e$ are also applied to a pair of variable width square wave generators 68, 70 where they initiate respective first and second cyclic gates $f$ and $g$. The lagging edges of the two gates, when both gates are present, are spaced from one another a time equivalent to approximately 16,000 yards of radar range. The respective widths of the first and second cyclic gates $f$ and $g$ are controlled by potentiometers 72 and 74. These are driven by a mechanical connection 36 from the gear train, in synchronism with the movement of the moving target. The approximate maximum range of each gate is about 34,000 yards. When a cyclic gate approaches this range the variable width square wave generator producing the gate is effectively removed from the circuit by switch 78. A more detailed description of the cyclic gate circuits will be given below.

Cyclic gates $f$ and $g$ are differentiated and their respective lagging edges used to trigger pulse-forming circuits 80, 82 so that at the outputs of these circuits, when two cyclic gates are present, two pulses $j$ are formed spaced apart 16,000 yards. If only one cyclic gate is present, on the other hand, only one pulse is formed. The single pulse or double pulse output of stages 80, 82 is applied to cyclic gate circuit 84 which provides one or two 2,000 yard cyclic gates $k$.

Returning again to the stable oscillator 60 shown at the upper left of FIG. 3, its sinusoidal output wave $a$ is applied through phase shifter 86 to trigger generator 88. The latter may be similar to the trigger generator 68. Phase shifter 86 is mechanically connected to gearing 32 (see also FIGS. 1 and 2) via mechanical connections 38, whereby the phase difference between the phase shifted wave and the fixed phase sinusoidal wave $a$ is a function of the range of the target of interest. The output phase shifter pulses $b$ and the 2,000 yard cyclic gates $k$ are applied to coincidence circuit 90. The coincidence circuit is of the type which produces an output pulse whenever a 2,000 yard cyclic gate occurs in time coincidence with one of pulses $b$. Thus, when the two 2,000 yard cyclic gates two output pulses $l$ are produced.

Output pulse $e$ of selector circuit 66 (shown in the upper portion of the drawing), is inverted by inverter 92 and applied to variable duration counter restoration gate 94. This last-named circuit is also known as a "dunk" gate for reasons which will be made clear below. The inverted pulses $e'$ initiate an output square wave pulse $m$ at the output of the dunk gate circuit 94. The function of this pulse is to effectively turn off 8-to-1 step-down counter 96. The first of the output pulses $l$ (when two output pulses are present) from coincidence circuit 90 effectively terminates the dunk gate. This in turn permits 8-to-1 step-down counter 96 to begin counting. The 8-to-1 counted-down pulses $n$ are applied through adder stage 98 to a blocking oscillator coincidence circuit 100 (lower right of FIG. 3).

The first output pulse from the 8-to-1 counter occurs 16,000 yards (eight 2,000 yard pulses) after the lagging edge of the variable duration "dunk" gate. This pulse is identified by the legend $x$ in FIG. 4n. The function of adder circuit 98 is to provide an additional pulse $y$ (FIG. 4n) 16,000 yards in front of pulse $x$. This additional pulse $y$ is applied directly from coincidence circuit 90 to the adder circuit 98. If the output of coincidence circuit 90 consists of two pulses spaced 16,000 yards from one another, the second of said pulses is in approximate time coincidence with pulse $x$. The function of blocking oscillator 100 is to select the one of the counted-down pulses in a given time relation to the echo signal of interest as will be explained in more detail below.

The inverted fixed phase reference pulses $e'$ in addition to being applied to the variable duration "dunk" gate are also applied through clamping diode 102 to phantastron circuit 104. These pulses initiate the square wave output $o$ of the phantastron circuit. The duration of square wave $o$ is determined by the setting of a potentiometer 106. This setting in turn is determined by the range of the echo pulse, the setting being changed by means of mechanical connection 40 from gearing 32. In typical embodiment of the invention potentiometer 106 may consist of a 10-turn multipot to cover the range from 0 to 100,000 yards.

Square wave output $o$ of phantastron circuit 104 is transformed into a negative-going pulse $p$ coincident with the lagging edge of square wave $o$ by differentiator and diode clipper circuit 108. The negative-going pulse $p$ triggers multivibrator gate generator 110 and the latter produces a 16,000 yard fixed duration gate. One of the counted-down pulses $n$ is in time coincidence with the approximate center portion of the gate and as this pulse moves in time the gate moves in time along with it so that this particular pulse always remains approximately centered in the gate. The blocking oscillator coincidence circuit 100 which is rendered operative by gate $q$ permits a selected one $r$ of the counted-down pulses $n$ to be passed through the gate and this selected pulse is the range trigger of the system.

In some forms of the invention, when the system is tracking, the selected range trigger $r$ may be in time coincidence with the echo of interest. In other forms of the invention the circuits may be arranged so that range trigger $r$ never coincides precisely with the echo of interest but instead initiates a narrow range gate pulse which is maintained, when the range triggering circuits are locked on, in approximate coincidence with the target return. It is to be understood that the range gate must either be manually or automatically placed on the target return (that is, the range gate must be made to occur in time coincidence with the echo of interest) before the automatic ranging circuits take over. Since these automatic ranging circuits, per se, play no part in the present invention, they will not be described in further detail.

Summarizing briefly the operation of the system of FIG. 3, a pulse $s$ selected from the fixed phase pulses $aa$ is used to trigger the transmitter. The time interval between pulse $s$ and an echo pulse of interest is measured by a coarse-fine measuring system. The fine measurement is of a time interval which may be some fraction of 16,000 yards. It is determined by a phase shifter 86 which shifts the phase of the reference sine wave $a$ an amount which is a function of the range of the target. This phase shifted sine wave is transformed to phase shifted pips $b$. One of phase shifted pips $b$ (the first occurring of pulses $l$) is selected by a circuit including the cyclic gate circuits 68 and 70 to start an 8-to-1 counted-down count. One of the 8-to-1 counted-down pulses (selected range trigger $r$) occurs at a predetermined time with respect to the return echo signal. The coarse measurement is the one between the first one of pulses $l$ (when two pulses are present) and the selected one (range trigger $r$) of the 8-to-1 counted-down pulses $n$. This interval of time is an integral multiple of the time equivalent of 16,000 yards of radar range.

Cyclic Gate and Related Circuits

Figure 5:
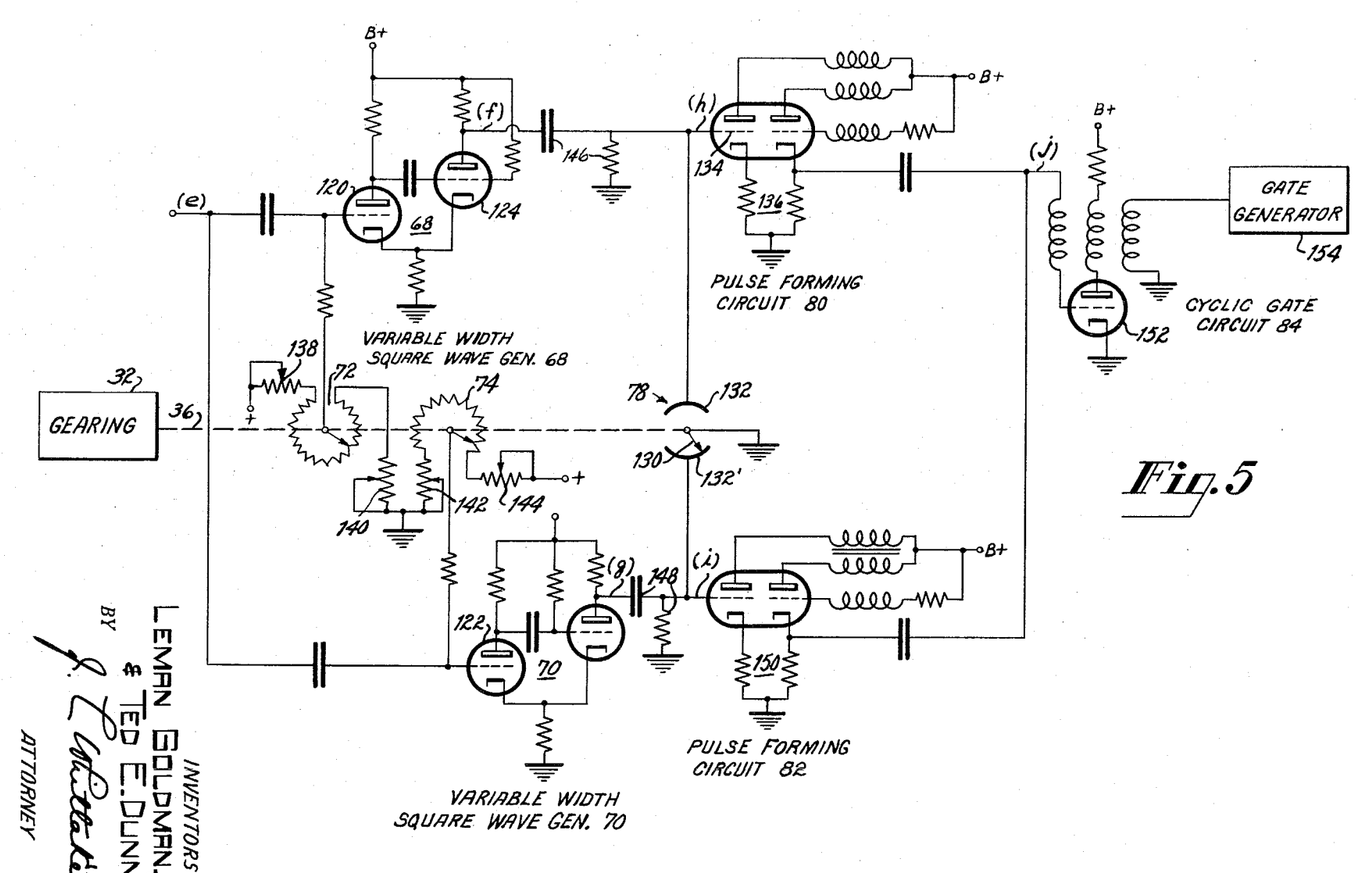
FIG. 5 is a schematic circuit diagram of the cyclic gate circuits and related circuits shown in FIG. 3.

FIG. 5 is a more detailed showing of the cyclic gate circuits 68, 70, pulse-forming circuits 80, 82 and the cyclic gate circuit 84. The system pre-trigger $e$ is applied directly to the control grids of two multivibrator circuits 68, 70. These multivibrator circuits have a single stable state of conduction. Thus, tubes 120, 122 are normally cut off and tubes 124, 126 are normally conducting. Input pulses $e$ render tubes 120 and 122 conductive and these tubes remain conductive for an interval of time which is a function of the setting of potentiometers 72 and 74. The setting of the potentiometers in turn is dependent upon the range of the target (when the system is tracking the target) since this setting is determined by means of gearing 32 in accordance with the position of the echo signal. Potentiometers 72 and 74 are continuously rotatable. It will be noted, however, that each potentiometer is formed with an open space, the spaces in the two potentiometers being 180° out of phase. When the potentiometer arm such as the one of 72, for example, moves adjacent the open space, arm 130 of switch 78 contacts the upper conductive portion 132 of the switch. This effectively grounds out the control grid 134 on the following multivibrator stage 136, thereby effectively removing the cyclic gate output of stage 68. The second cyclic gate circuit 70 operates in the same way.

Figure 9:
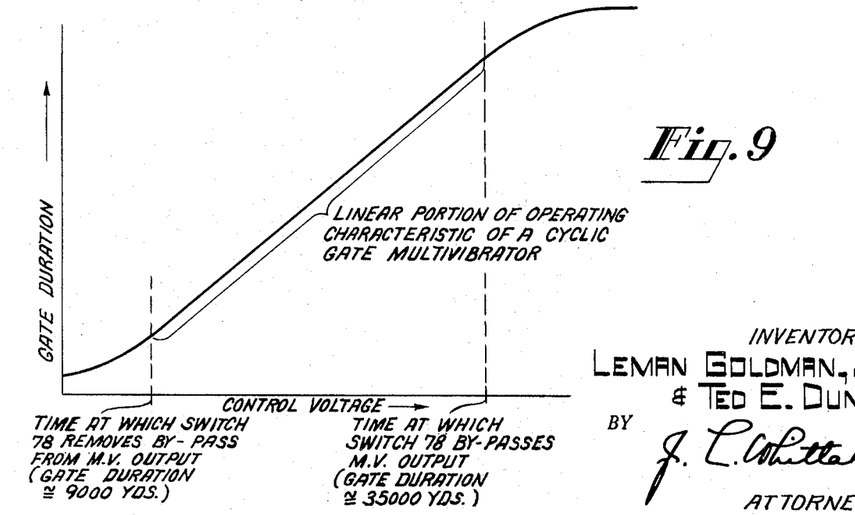
FIG. 9 is graph of the operating characteristics of the cyclic gate circuits shown in FIG. 5.

In a typical embodiment of the invention the minimum gate interval was approximately 9,000 yards in the 100,000 yard range and the maximum gate interval was approximately 35,000 yards in the 100,000 yard range. Note in this connection that the trigger pulse $s$ occurs 18,000 yards after the pre-trigger whereby it occurs 9,000 yards after the lagging edge of the minimum duration cyclic gate. It is important, of course, that the durations of the cyclic gates vary linearly as a function of target range. For this reason multivibrators 68 and 70 are operated in their linear region. Thus, switch 78 is arranged to by-pass the output of a cyclic gate multivibrator before the latter reaches the non-linear portion of its characteristic (maximum gate duration) and to remove the by-pass after the same multivibrator again reaches the linear portion of its characteristic. This is illustrated in FIG. 9. When two gates $f$ and $g$ are present, the respective lagging edges of the gates are employed to trigger the 2,000 yard duration cyclic gate circuit 84, whereby the latter produces two 2,000 yard cyclic gates $k$. Each of the cyclic gates $k$ is centered on a phase shifted pip $b$. The phase shifted pip $b$ selected by the first of gates $k$ is employed to trigger the 8-to-1 step-down counter 96. When the range of a target being tracked increases past a predetermined range, the second 2,000 yard gate $k$ disappears; the first gate, however, continues to move out in range. When the range of the target increases another predetermined amount, the second gate reappears prior in time to the first gate by about 16,000 yards. This second gate may now be thought of as the first gate and it starts the 8-to-1 counter the equivalent of 16,000 yards earlier in time. This cyclic process is continuously repeated, as described, as range increases. A similar cyclic process occurs as range decreases.

Assume for purposes of this explanation that due to changing circuit parameters and/or changing ambient temperatures, there is some drift in the present adjustment of the spacing of the lagging edges of gates $f$ and g. Even if this amount of drift were to be as much as 950 yards so that, for example, instead of being 16,000 yards apart the lagging edges of the first and second cyclic gates were 16,950 yards apart, there would still be no error introduced into the system. In such case, when the second cyclic gate g disappeared and later reappeared, of shorter duration, as the first cyclic gate, its lagging edge would occur 15,050 yards in front of the other cyclic gate rather than 16,000 yards in front of said other cyclic gate. However, it would still select the one of phase shifted pips b 16,000 yards in front of the one previously employed to start the 8-to-1 counter. Of course, rather than appearing in the center of the "first" occurring 2,000 yard gate k, this selected pulse would instead appear only 50 yards after the leading edge of this first occurring cyclic gate k.

From the above explanation, it is clear that for the most stable type of operation the lagging edges of gates f and g should initially be adjusted to be spaced the equivalent of 16,000 yards of radar range. Vernier adjustment of the spacing may be made at potentiometers 138, 140, 142 and 144 (FIG. 5). In a practical system such adjustment would be made at the factory and, perhaps, in the field during occasional inspection intervals. During operation of the system it can normally be assumed that there will be no drift so excessive as to require readjustment of the Vernier adjustment.

Referring still to FIG. 5, cyclic gates f and g are differentiated by respective RC differentiator circuits 146 and 148 and the negative output pulses h and i respectively used to trigger blocking oscillators 136 and 150. These produce a pair of pulses (when switch 78 is effectively out of circuit) which are combined in blocking oscillator 152 to produce a pair of trigger pulses j. When arm 130 contacts arm 132 or 132', however, only one trigger pulse is produced. Pulses j are spaced apart the equivalent of 16,000 yards of radar range. These pulses (or pulse) are applied to gate generator 154 to produce the 2,000 yard cyclic gates or gate.

Figure 6:
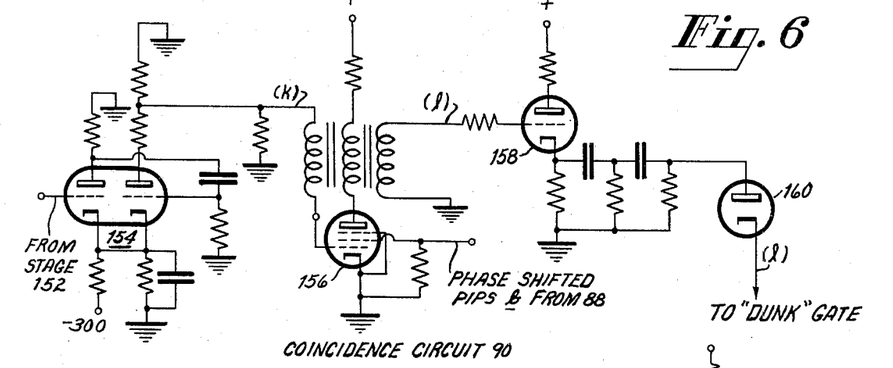
FIG. 6 is a schematic circuit diagram of one of the coincidence circuits and related circuits shown in FIG. 3.

A portion of gate circuit 84 is shown in greater detail in FIG. 6. It includes a multivibrator having a single stable state of conduction. Each input pulse results in an output gate k having a duration equivalent to 2,000 yards of radar range. The gates are applied to coincidence circuit 90 consisting of a pentode 156. The variable phase pulses b are applied to the screen grid of the pentode. The circuit is a blocking oscillator coincidence circuit which produces an output pulse l when a 2,000 yard cyclic gate is in time coincidence with one of the phase shifted pulses. Pulses l are applied to the control grid of a coupling cathode follower stage 158 and thence through a coupling diode 160 to the "dunk" gate circuit 94 (FIG. 1) as will be explained more fully below. The first of the pair of pulses l, when two pulses are present, determines the time at which the "dunk" gate ends or, in other words, determines the time the 8-to-1 step-down count begins.

Figure 7:
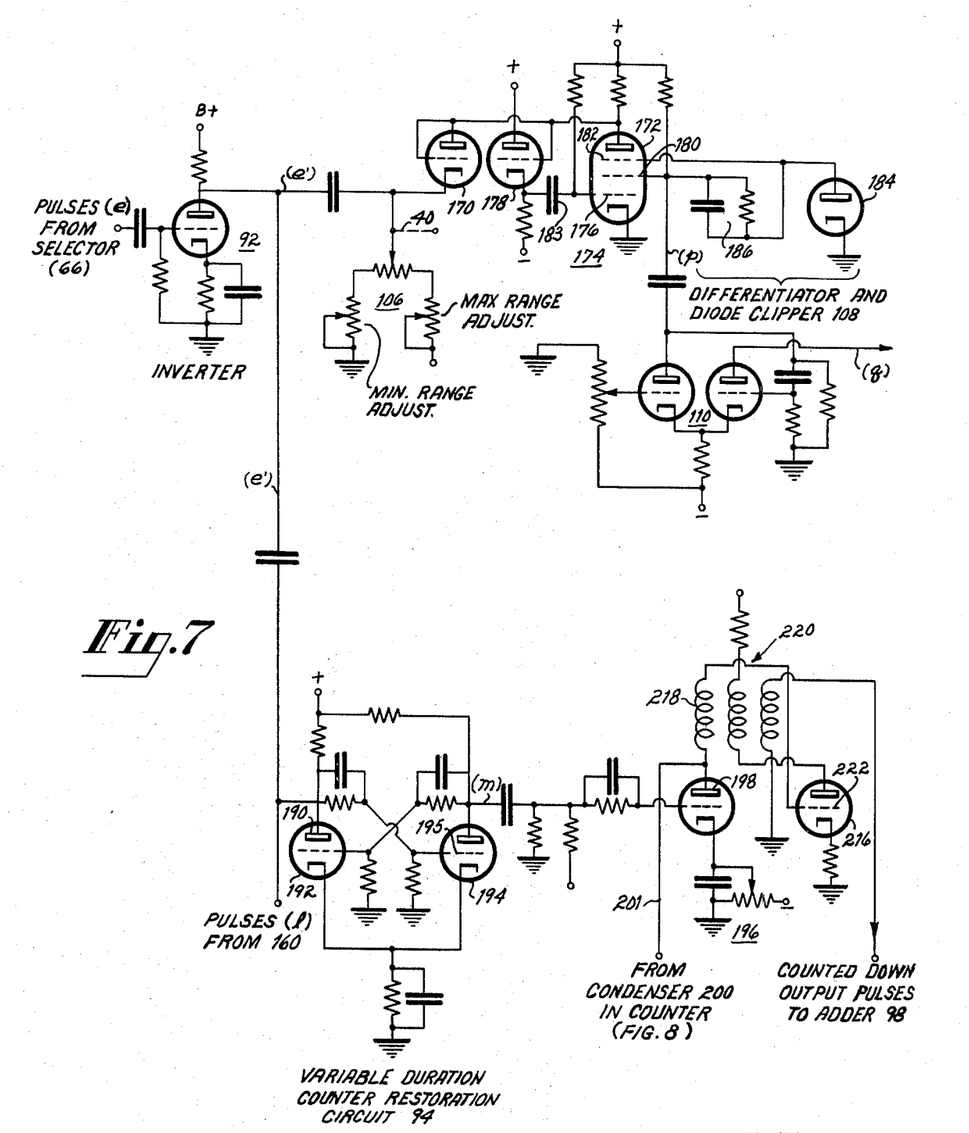
FIG. 7 is a schematic circuit diagram of the phantastron circuit, variable counter duration storage circuit, and other associated circuits of the system of FIG. 3.

Phantastron Circuit, Variable Duration Counter Restoration Circuit and Related Circuits Referring now to FIG. 7, inverter 92 receives positive-going pre-triggers e and provides negative-going triggers e'. The negative-going triggers are applied through triode 170 connected as a clamping diode, to the anode 172 of phantastron circuit 174. A negative trigger applied to anode 172 starts a regenerative circuit operation in which the plate assumes all of the space current in the pentode it can obtain. The plate, however, is coupled to the control grid 176 of the phantastron through cathode follower speed-up circuit 178. This circuit speeds up circuit recovery. At the end of the timing period, after control grid 176 has been going slowly positive and plate 172 linearly negative, grid 182 begins to cut off plate current and plate 172 swings positive. It is at this point that tube 178 conducts heavily, charging capacitor 183 in series with control grid 176 quickly, thus speeding recovery.

Diode clamper 184, which is directly connected to the suppressor grid, acts as a clamp on the latter's positive rise when the phantastron operation is initiated. The rise of the anode voltage and the drop in the screen voltage is limited only by the time required to return the resistor-condenser circuit of diode clamper 170 to its initial state. The duration of a positive pulse produced at the screen grid 180 is controlled by the clamping voltage applied to anode 172 through diode 170 and potentiometer 106. As mentioned above, this potentiometer in a typical embodiment of the invention may be a 10-turn multipot. The clamping voltage tapped off the potentiometer is a direct function of the range of the target.

The output signal of the phantastron is a positive rectangular wave o (FIG. 4) produced at screen grid 180. This wave is differentiated by RC circuit 186 and the negative differentiated pulse p, which is in time coincidence with the lagging edge of the phantastron output wave, used to trigger the multivibrator gate generator 110. This last stage consists of a multivibrator having a single stable state of conduction. The output waveform q of the multivibrator is a square wave having a duration the equivalent of 16,000 yards of radar range.

Referring now to the variable duration counter restoration circuit 94, (FIG. 7) inverted pre-trigger pulses e are applied to the anode 190 of the multivibrator. This multivibrator is a bistable multivibrator and in its quiescent condition section 194 conducts and section 192 is cut off. The application of a negative pulse to anode 190 and control grid 195 transposes the multivibrator to its second stable state, that is, section 194 is cut off and section 192 conducts. Pulse or pulses l are also applied to the anode 190 and control grid 195. They are positive-going and so the first of the pulses after the occurrence of negative-going pulse e' causes multivibrator 94 to resume its quiescent state, that is, section 192 cutoff and section 194 conducting. If both generators 68 and 70 (FIG. 1) produce output waves (neither one by-passed by switch 78) and two pulses l applied to anode 190 and control grid 195 for each negative-going pulse e', the second pulse l would have no effect. This is because at the time of the second pulse l control grid 195 would already be positive and anode 190 would also be positive. The output of stage 94, therefore, is a positive-going "dunk" gate m. This positive-going gate is applied to stage 196 and during its duration, stage 196 conducts heavily driving anode 198 negative. The negative voltage is applied to charging capacitor 200 (FIG. 8) of the counting circuit and the charging capacitor therefore discharges through diode 202 (FIG. 8) to the diode clamping level of −150 volts.

Step-Down Counter and Related Circuits

Figure 8:
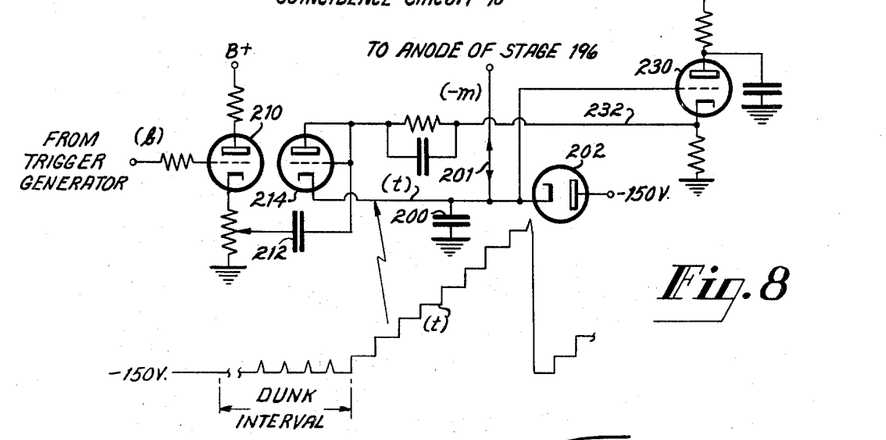
FIG. 8 is a schematic circuit diagram of the counter circuit of the system of FIG. 3.

Referring now to FIG. 8, phase shifted pulses b are applied through cathode follower 210 to a series circuit including capacitor 212, triode (connected as a diode) 214 and capacitor 200. These pulses charge capacitors 212 and 200 to voltages inversely proportional to their capacity.

As mentioned above, during the duration of the "dunk" gate, charging capacitor 200 is maintained at a clamping level of −150 volts. This is shown in waveform *t* immediately below the circuit. The "dunk" gate ends coincidentally with one of the phase shifted pulses *b* and the count begins at this time. Succeeding pulses *b* raise the voltage level of capacitor 200 in steps until the level of capacitor 200 is sufficient to fire blocking oscillator 196, 216 (FIG. 7).

Referring now to FIG. 7, the charge on capacitor 200 is applied via lead 201 as a voltage to the anode 198 of triode 196. The anode is connected directly through coil 218 of pulse transformer 220 to the control grid 222 of triode 216. With each succeeding pulse *b*, the charge on condenser 200 becomes more positive and accordingly the voltage applied to anode 198 and control grid 222 also becomes more positive. After the eighth pulse, control grid 222 is driven sufficiently positive to render triode 216 conductive. This starts the blocking oscillator regenerative action and a single output pulse is produced in time coincidence with the eighth input pulse to the counter and with every eighth following pulse.

Referring again to FIG. 8, the charging of capacitor 212, would ordinarily bias diode 214 in such a way as to reduce the amount of charge reaching storage capacitor 200 and this would produce a condition of unequal step height. A feedback circuit is employed to avoid this type of operation. This includes cathode follower 230, the control grid of which is connected to charging capacitor 200. The output of the cathode follower is fed back to the anode of diode 214 via lead 232. Thus, as the voltage level of the charged condenser increases, the feedback circuit tends to remove the charge from condenser 212 in order to maintain the step height of waveform *t* uniform. The relative values of condensers 200 and 212 are such that eight pulses *b* raise the level of condenser 200 sufficiently to fire the blocking oscillator.

In the discussion above, various specific values are assigned to different circuit components, different delay intervals, etc. These are meant merely to be illustrative and not to be limiting. It will be apparent to those skilled in the art, for example, that a time base reference oscillator may be employed having a frequency other than approximately 82 kc. Also, if desired, the pulses *b* may be counted down by more or less than 8-to-1 according to the characteristics desired of the timing equipment. Also, although blocking oscillators and multivibrators are employed in specific circuits as pulse formers and gate formers other equally well known circuits may be employed instead.

What is claimed is:

1. A phase shifter comprising, in combination, means for generating a first wave of predetermined frequency; means for generating a second wave at said predetermined frequency; generator means responsive to a given selected portion of said second wave for generating a third wave coherent in phase with said second wave and having a frequency which is subharmonically related to said predetermined frequency; means for shifting the phase of said second wave relative to that of said first wave; and means responsive to a shift in said phase of greater than a predetermined angle for rendering said generator means responsive to a different selected portion of said second wave, this one spaced from said given selected portion an amount equal to one period of said third wave, in the direction opposite that of said phase shift.

2. A phase shifter comprising, in combination, means for generating a first wave of predetermined frequency; means for generating a second wave at said predetermined frequency; generator means responsive to a given selected portion of said second wave for generating a third wave coherent in phase with said second wave and having a frequency which is subharmonically related to said predetermined frequency; means for shifting the phase of said second wave relative to that of said first wave; and means responsive to a shift in said phase of an angle approximately equal to the period of one cycle of said third wave for rendering said generator means responsive to a different selected portion of said second wave, this one spaced from said given selected portion an amount equal to one period of said third wave, in the direction opposite that of said phase shift.

3. In an arrangement for shifting the phase of one selected pulse relative to that of another selected pulse, in combination, means for generating a series of first pulses spaced fixed intervals from one another, a given one of said pulses comprising one of said selected pulses; means for generating a series of second pulses spaced said fixed intervals from one another; means for adjustably shifting the phase of said series of second pulses relative to that of said series of first pulses; generator means responsive to a given one of said second pulses for deriving from said series of second pulses a series of third pulses spaced a given plurality of times said fixed intervals from one another, one of said third pulses comprising the other of said selected pulses; and means responsive to a shift in phase between said series of first pulses and said series of second pulses an amount approximately equal to one period of said series of third pulses for rendering said generator means responsive to the one of said second pulses spaced from said given pulse an amount equal to one period of said series of third pulses in the direction opposite to that of said phase shift.

4. In an arrangement for shifting the phase of one selected pulse relative to that of another selected pulse, in combination, means for generating a series of first pulses spaced fixed intervals from one another, a given one of said pulses comprising one of said selected pulses; means for generating a series of second pulses spaced said fixed intervals from one another; means for adjustably shifting the phase of said series of second pulses relative to that of said series of first pulses; generator means responsive to a given one of said second pulses for deriving from said series of second pulses a series of third pulses spaced a given plurality of times said fixed intervals from one another, one of said third pulses comprising the other of said selected pulses; and means including a pair of variable width square wave generators responsive to a shift in phase between said series of first pulses and said series of second pulses an amount approximately equal to one period of said series of third pulses for rendering said generator means responsive to the one of said second pulses spaced from said given pulse an amount equal to one period of said series of third pulses in the direction opposite to that of said phase shift.

5. In an arrangement as set forth in claim 3, further including means for choosing said one selected pulse at an aperiodic rate including, a source of aperiodically recurring pulses, means responsive to said aperiodically recurring pulses for producing gate pulses having a duration equal to slightly less than that of said fixed intervals; coincidence means connected to receive said gate pulses and said series of first pulses for producing an output pulse whenever a first pulse occurs during the interval of a gate, said output pulse comprising said one selected pulse.

6. In an arrangement as set forth in claim 3, further including means for choosing said one selected pulse at a random rate including, a source of randomly occurring pulses, said pulses being spaced from one another intervals not less than the interval between said two selected pulses, means responsive to said randomly recurring pulses for producing gate pulses having a duration equal to slightly less than that of fixed intervals; coincidence means connected to receive said gate pulses and said series of first pulses for producing an output pulse whenever a first pulse occurs during the interval of a gate, said output pulse comprising said one selected pulse.

7. In the arrangement as set forth in claim 3, further including means for choosing said one selected pulse at a time modulated rate including, a source of time modulated pulses spaced from one another intervals not less than the interval between said two selected pulses; means responsive to said time modulated pulses for producing gate pulses having a duration equal to slightly less than that of fixed intervals; coincidence means connected to receive said gate pulses and said series of first pulses for producing an output pulse whenever a first pulse occurs during the interval of a gate, said output pulse comprising said one selected pulse.

8. A cyclic gate circuit comprising, in combination, first variable width square wave generator means; second variable width square wave generating means; means for simultaneously triggering both of said square wave generator means; means for independently adjusting the durations of the square wave outputs of said two generator means, said adjusting means normally being set to maintain the lagging edges of said waves spaced a given interval of time from one another; means for effectively disabling a square wave generator when its output wave is both of greater duration than the output wave of the other square wave generator and is of greater than a predetermined duration; and means operatively associated with said adjusting means for effectively re-enabling said disabled square wave generator means when said other output wave is greater than a second predetermined duration, and causing said re-enabled square wave generator to produce a square wave output which is less in duration than that of said other square wave by approximately said given time interval.

9. In a radar ranging system, in combination, a stable source of sinusoidal waves; means for deriving from said source a series of first pulses spaced fixed intervals from one another; means for adjustably shifting the phase of said sinusoidal waves; means for generating from said phase shifted sinusoidal waves a series of second pulses spaced said fixed intervals from one another; generator means responsive to a given one of said second pulses for deriving from said series of second pulses a series of third pulses spaced a given plurality of times said fixed intervals from one another, said series of third pulses being coherent in phase with said series of second pulses; and means responsive to a shift in phase between said series of first pulses and said series of second pulses an amount approximately equal to one period of said series of third pulses for rendering said generator means responsive to the one of said second pulses spaced from said given pulse an amount equal to one period of said series of third pulses in the direction opposite to that of said phase shift.

10. In a radar ranging system as set forth in claim 9, said generator means comprising a step-down counter circuit.

11. In a radar ranging system as set forth in claim 10, said means responsive to a shift in phase including a pair of variable width square wave generator means, and means operative in synchronism with said shift in phase for adjusting the widths of the square wave outputs of said generator means.

12. In a radar ranging system as set forth in claim 11, further including means for selecting from said series of first pulses a pulse for triggering a radar transmitter.

13. In an arrangement as set forth in claim 12, further including selector means for selecting one of said third pulses for following the range of a target it is desired to track with said ranging system.

14. In a radar ranging system, in combination, a stable source of sinusoidal oscillations; means for deriving from said source a series of first pulses spaced fixed intervals from one another; a source of randomly occurring pulses; selector means connected to receive said randomly recurring pulses and said first pulses for selecting certain ones of said first pulses at a randomly recurring rate; phase shifting means for shifting the phase of said sinusoidal oscillations; means for deriving from said phase shifted sinusoidal oscillations a series of second pulses; a step-down counter circuit; cyclic means operatively associated with said phase shifting means and receptive of said selected pulses for rendering said step-down counter operative beginning at a time in coincidence with a given one of said second pulses, the output of said step-down counter comprising a series of third pulses spaced a given plurality of times said fixed intervals from one another; selector means receptive of said third pulses for selecting a given one of said third pulses; and means including said cyclic gate means responsive to a shift in phase between said series of first pulses and said series of second pulses an amount approximately equal to one period of said series of third pulses for rendering said step-down counter responsive to the one of said second pulses spaced from said given second pulse an amount equal to one period of said series of third pulses in the direction opposite to that of said phase shift.

* * * * *